United States Patent Office 2,769,720
Patented Nov. 6, 1956

2,769,720
FORMULA FOR CEMENTITIOUS COMPOSITION

Albert L. Talone, Philadelphia, Pa.

No Drawing. Application December 15, 1954,
Serial No. 475,576

1 Claim. (Cl. 106—97)

This invention relates to improved, slow-setting cementitious aggregates with controlled plasticity and more particularly to compositions which adhere to highly absorbent surfaces wherein the compositions must be capable of retaining sufficient water to allow hydration of the cement used and where the thixotropic properties and drying times of the compositions must be such that adequate time is allowed for working with the wet mixture and where the final compositions will not sag while setting.

In many applications of the type where wet aggregates are applied directly to a highly porous surface, such compositions as Portland cement or white cement are used. Due to the osmotic pressure of the capillaries contained on the porous surface, water is rapidly removed from the wet composition with insufficient water left to allow for complete hydration of the cement used, resulting in an abnormally rapid setting time with the final set mass being powdery, non-cohesive and easily crumbled. Other compositions prepared in an effort to overcome these difficulties consist of mixtures of the aforementioned cement plus swelling type clays, such as Wyoming bentonites. These compositions, while successfully preventing excessive water loss from the wet mixture into the porous mass, produce a hardened material of a poor mechanical strength which is not adhesive. In addition to these compositions, other materials produced have the same shortcomings mentioned and other defects, such as rapid setting time and shrinkage on setting.

Accordingly, one object of this invention is to provide cementitious aggregates to overcome the aforementioned difficulties.

Another object of this invention is to provide a slow-setting, non-shrinking, thixotropic, water-retaining, cohesive cementitious composition which can be used effectively on highly porous surfaces.

A further object of this invention is to provide a slow-setting, non-shrinking, thixotropic, water-retaining, cohesive cementitious composition which can be used effectively on highly porous surfaces and which is white in color to which pigments can be added to effectively alter the color of the hardened mixture to any desired color, tint and shade.

Other objects of this invention will become apparent as the description proceeds.

The essential ingredients of my novel concrete comprise cement, finely powdered kaolin, pumice and a salt. The cement may be a commercially available Portland cement or a white cement, when it is desirable to produce a white final product.

A fine ground kaolin with a particle size ranging from 35 to ½ micron and with an average particle size of 0.5 to 5 microns is preferred for use in this mixture. The color should be white so that added pigments do not produce off-colored shades.

The pumice used should be of a uniform, fine-ground, light colored type. Fine ground pigment is added to produce the desired color in the set material. A salt, such as sodium chloride or cream of tartar is blended into the mixture prior to the addition of water in the ratio of 0.1 ounce to 1 ounce per pound of mixture.

These components may be intermixed by any commercially available process and equipment resulting in a relatively homogeneous mixture of the powdered materials involved.

The preferred compositions of this invention comprise a mixture of 100 parts of cement, 5 to 25 parts of kaolin, 10 to 50 parts of pumice and 0.62 to 6.2 parts of a salt such as sodium chloride or cream of tartar.

While not being bound by any theory, it has been postulated that the kaolin acts in the final mixture to make a creamier more plastic composition and to plug the capillaries of porous solids and thus prevent osmotic removal of water. Pumice adds mechanical strength to the hardened set material and the salt used alters the water absorption properties and colloidal properties of the fine ground kaolin without affecting the hydration properties of the cement, producing a harder and more cohesive concrete.

The novel properties of these mixtures are shown by the following examples:

Example I

When tile is put up with mastic cement, it must be grouted. That is, the spaces between adjacent tile must be filled in with a cement composition to finish the surface. Normally, a cement-water mixture is applied to tiles which have been soaked with water to prevent excessive water removal from the grouting mixture. The cement-water mixture sets very rapidly and must be removed from the baked surface rapidly and completely or a film remains. After sections of tiling are soaked, a man can complete about 12 to 15 square feet using this sequence of operations and then, he must start again. Using such a series is a slow and tedious job with uncertain results. Using a mixture of 100 parts of white cement, 10 parts of pumice, 10 parts of kaolin, 2.5 parts of salt, and 60 parts of water, it was not necessary to wet down the tile prior to applying the material. 40 to 50 square feet of surface was grouted and the excess, still not set, was easily wiped off. After setting for 24 hours, the surface was examined, and revealed that using the novel composition, no film was left on the glossy portion of the tile and that the area between tiles had hardened to the desired point without shrinkage, leaving a cohesive, white layer in the desired space. This layer of set concrete was resistant to abrasion and to the further action of water.

Example II

For the application of Example I, where it was desired to produce a yellow tinted compound for grouting yellow tile, a mixture of 100 parts white cement, 10 parts of pumice, 15 parts of kaolin, 0.5 part of salt and 0.75 part of fine ground antimony sulfide powder were blended, and this blend was mixed with 65 parts of water and used for grouting 50 square feet of tiling which had previously been applied to plaster board with a mastic composition. This application was completed prior to wiping any of the excess off. Examination of the test at the end of a 24 hour setting period revealed that the composition had set to a hard and durable mass with no film on the glazed portion of the tile. A test panel made with six tiles grouted with this composition was allowed to set for 24 hours and then subjected to the action of moving water across the face of the tiling for 168 hours. None of the grouting was eroded away during this test.

It is to be noted in the above example that the outstanding characteristics of whiteness of color, which allows great latitude in pigmenting, slowness of setting, which allows large areas to be worked on without premature setting of the composition and application to the dry tile are demonstrated for this novel composition.

Example III

The composition of Example II in which the antimony sulfide pigment was replaced with 1.0 part of Whiting, a fine, powdered calcium carbonate. This mixture was blended and mixed with 60 parts of water. It was used to point brick work. Because of the viscosity and thixotropic characteristics of the creamy mixture, it was easily applied. The set composition showed no shrinkage and gave a durable weather resistant finish.

The above examples are given to illustrate applications of this novel composition and not to limit this invention except as found necessary by the appended claims and prior art.

It is recognized further that the pumice can be deleted from these compositions for the aforementioned use. However, normally, the set concrete without pumice will not exhibit the degree of cohesion noted in the above formulations.

What is claimed as new is as follows:

A cementitious aggregate for a slow-setting, non-shrinking, thixotropic, water retaining, whitish cohesive cementitious composition capable of use on highly porous surfaces which consists of a mixture in parts by weight of 100 parts Portland cement, 5–25 parts kaolin, 10–50 parts pumice, and .62–6.2 parts of a salt selected from the group consisting of sodium chloride and potassium bitartrate.

References Cited in the file of this patent

UNITED STATES PATENTS

| | | |
|---|---|---|
| 1,170,038 | Beebe et al. | Feb. 1, 1916 |
| 1,755,502 | Collings | Apr. 22, 1930 |
| 1,885,731 | Kraus | Nov. 1, 1932 |